United States Patent [19]
Jones et al.

[11] Patent Number: 6,136,121
[45] Date of Patent: Oct. 24, 2000

[54] METHOD AND APPARATUS FOR SEPARATING AND RECLAIMING TRIM FROM A LAMINATION MACHINE

[75] Inventors: Michael Brandt Jones; Joseph J. Rudisi, both of Virginia Beach; Richard Neil Harford, Chesapeake; John Paul Harvey; Janusz Doniewski, both of Virginia Beach, all of Va.

[73] Assignee: Mitsubishi Chemical America, Inc., Chesapeake, Va.

[21] Appl. No.: 09/160,051

[22] Filed: Sep. 25, 1998

[51] Int. Cl.$^7$ ........................................................ B32B 35/00
[52] U.S. Cl. ............................ 156/94; 156/344; 156/584; 264/37.3; 29/426.3; 29/426.5; 29/564.3
[58] Field of Search ............................ 156/94, 344, 584; 264/37.3, 37.31, 37.32, 37.33; 29/426.3, 426.4, 426.5, 564.3

[56] References Cited

U.S. PATENT DOCUMENTS

| | | |
|---|---|---|
| 2,882,188 | 4/1959 | Levin et al. . |
| 3,094,454 | 6/1963 | Moore ..................................... 156/344 |
| 3,769,137 | 10/1973 | Moriyama et al. . |
| 3,773,601 | 11/1973 | Steffa . |
| 3,951,727 | 4/1976 | Greenberg . |
| 4,183,751 | 1/1980 | Matsumoto et al. . |
| 4,246,058 | 1/1981 | Reed . |
| 4,349,402 | 9/1982 | Parker . |
| 4,405,401 | 9/1983 | Stahl . |
| 4,452,664 | 6/1984 | Grey, Jr. et al. . |
| 4,508,425 | 4/1985 | Tanaka et al. . |
| 4,652,487 | 3/1987 | Morman . |
| 4,707,207 | 11/1987 | Baus . |
| 4,822,445 | 4/1989 | Yamaguchi ......................... 156/344 X |
| 4,994,130 | 2/1991 | Ichikawa et al. . |
| 4,995,933 | 2/1991 | Brussel ............................... 156/344 X |
| 5,194,109 | 3/1993 | Yamada . |
| 5,252,169 | 10/1993 | Bechmann . |
| 5,304,276 | 4/1994 | McLeod et al. . |
| 5,366,803 | 11/1994 | Nakazawa et al. . |
| 5,412,925 | 5/1995 | Tani et al. . |
| 5,500,072 | 3/1996 | Fujimura et al. . |

FOREIGN PATENT DOCUMENTS 51-30878  3/1976  Japan ..................................... 156/344

*Primary Examiner*—Mark A. Osele
*Attorney, Agent, or Firm*—Oblon, Spivak, McClelland, Maier & Neustadt, P.C.

[57] ABSTRACT

A device for separating layers of laminate trim includes a pair of nip rollers defining a feed path for a laminate, at least two winders and a drive system for the winders. The winders are preferably arranged on an upstream side of the nip rollers. The device can be provided at the output of a lamination machine to receive longitudinal trim portions cut from a laminate being formed by the lamination machine, so as to provide continuous delamination of trim exiting the lamination machine. In the case of a three (or multiple) layer laminate, the device can include a third winder (or additional winders) for collecting a middle layer of the laminate.

23 Claims, 6 Drawing Sheets

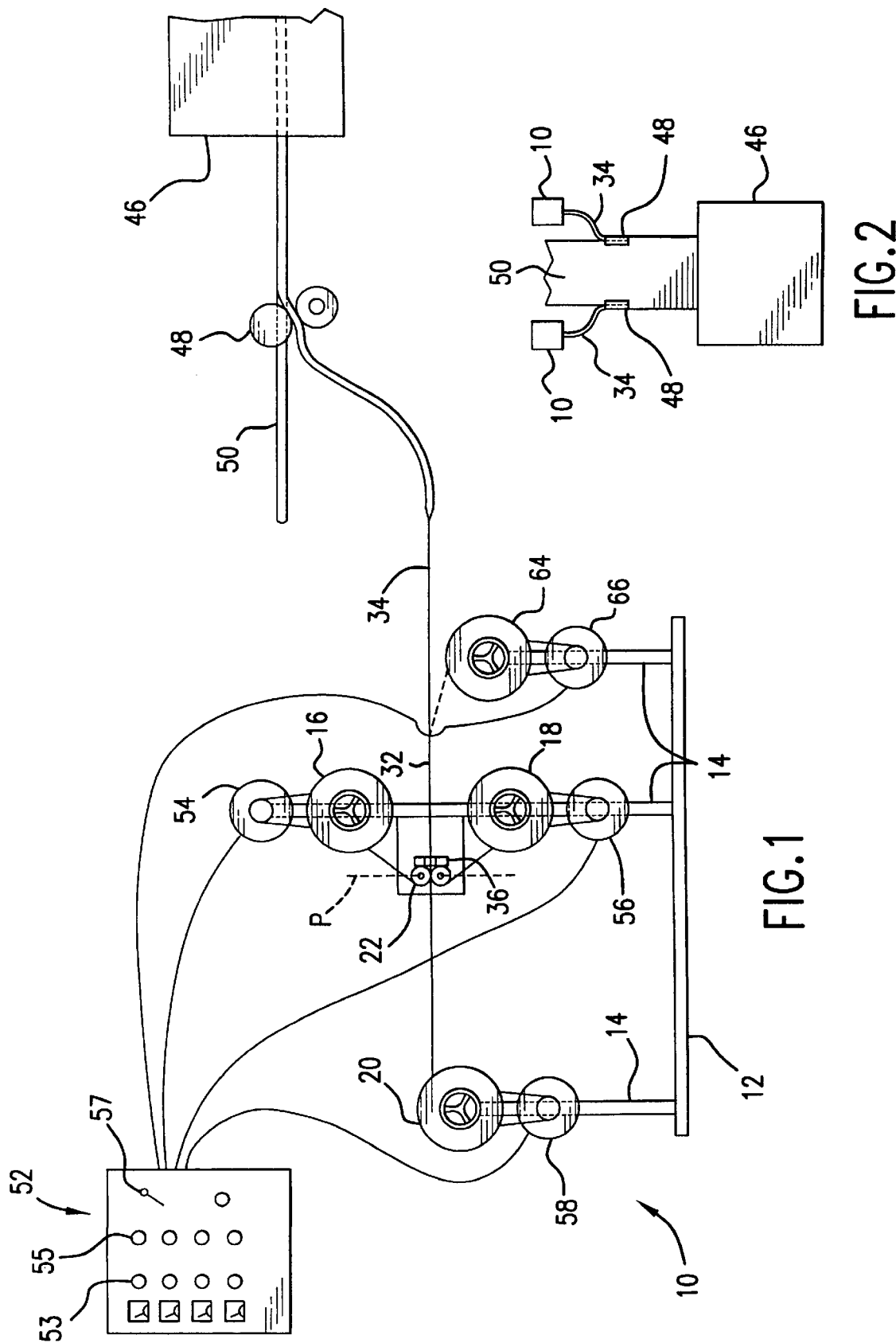

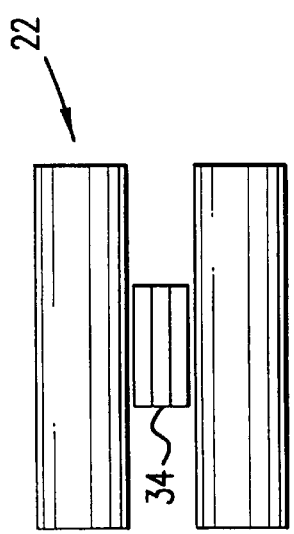
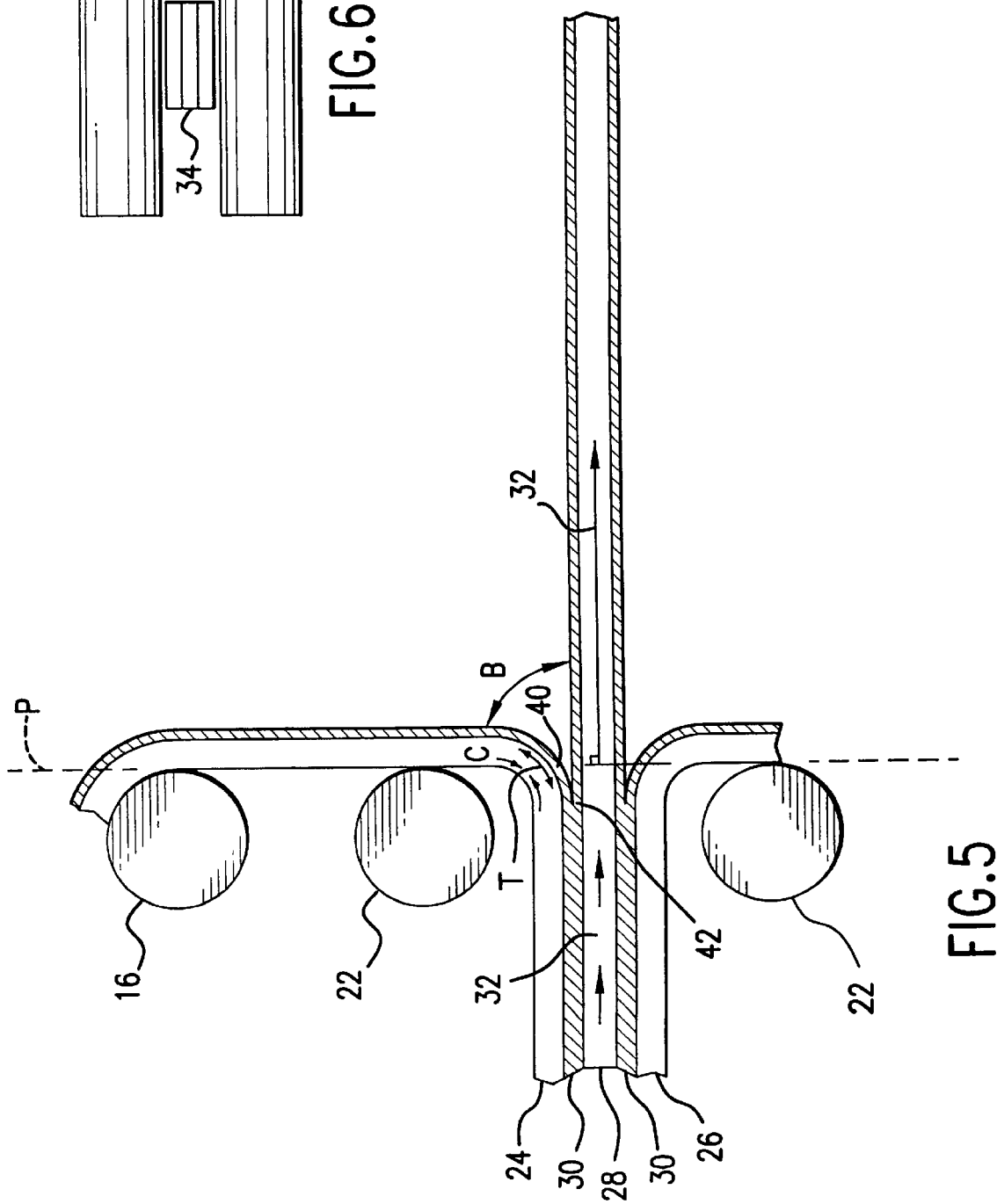

METHOD AND APPARATUS FOR SEPARATING AND RECLAIMING TRIM FROM A LAMINATION MACHINE

TECHNICAL FIELD

The invention relates to a method and apparatus for separating and reclaiming trim from a lamination machine, and particularly to an improved device and method for separating layers of side trim of an aluminum composite material.

BACKGROUND OF THE INVENTION

Discussion of the Background

Aluminum-polyethylene composite laminates, as well as other types of composite laminates, are useful for a number of architectural applications, because the laminates combine light weight with high strength. These laminates may be used as finished surfaces or for all or portions of the interior or exterior surfaces of a building or an automobile.

In the field of composite material manufacturing, a lamination machine is used to produce a composite material consisting of, for example, a layer of polyethylene sandwiched between layers of sheet aluminum. U.S. Pat. No. 4,994,130 to Ichikawa et al. teaches a lamination machine which includes pay off reels 3 and 3' that are used to feed the sheet aluminum to preheaters 6 and 6', then to hot press bonding rollers 2 and 2' where a synthetic resin sheet is pressed between the aluminum sheets, and thereby bonded to the aluminum sheets with a thermally activated adhesive. The lamination machine typically uses large rolls of sheet aluminum and extruded polyethylene to form long continuous sheets of composite material. In order to ensure a uniform or complete distribution of polyethylene between the aluminum sheets, it is common to extrude the polyethylene so that it is slightly wider than the aluminum sheet rolls. Therefore the composite laminate leaving the laminating machine will typically have a small amount of polyethylene projecting from the edge of the material. In order to ensure that the edge of the final product is flush, the longitudinal edge of the sheet is trimmed off as it leaves the lamination machine, and the trimmed laminate is then cut laterally to form panels. The continuous longitudinal trimming the edge of the laminate results in large amounts of trim material, that heretofore have been wasted.

Since the materials which form composite materials, such as aluminum-resin composites, can be expensive, particularly in large volumes, it is desirable to recycle both the metal and the resin components. In the past, panels or sheets of such composite materials have been recycled. In recycling such sheets, for example, when the metal sheets include aluminum, it is important to separate the aluminum from the thermoplastic resin prior to melting the thermoplastic resin, since melting of the aluminum-thermoplastic resin leads to conversion of the aluminum to aluminum oxides and a poor yield of recovered aluminum. It is known to separate aluminum polyethylene laminate composite utilizing a two stage process, in which the laminate is first heated and then pressed between picking rolls. See U.S. Pat. No. 5,500,072 to Fujimura et al. col. 1, lines 58–67. However, this method is not effective when the aluminum sheet is relatively thick or is composed of less pure and less flexible aluminum. Furthermore, it has been found that heating the laminate for separating requires a large amount of energy, and is not conducive to a continuous separating process.

U.S. Pat. No. 5,500,072 to Fujimura et al. teaches a method and apparatus for separating aluminum sheets from thermoplastic resins that are cut into panels. Fujimura et al. teach a method and apparatus which includes feeding the cut laminate through embossing rollers, then through a heating zone. When the material emerges, "it separates spontaneously into its component metal sheets 4 and resin core 3 upon cooling." See Fujimura et al. at column 6, lines 4–6. However, a process which requires heat consumes a substantial amount of energy, and is therefore costly, and contrary to the purpose and desirability of recycling, particularly with a relatively small width trim (e.g., trim separated from the longitudinal edges of a laminate).

U.S. Pat. No. 5,194,109 issued to Yamada teaches a method for recovering scraps of a multilayer plastic sheet or film. With the Yamada method, the scrap is heated to a temperature lower than the softening point of the base material layer so that the inter-laminar peeling strength of the adhesive resin is lower than the strength of the weakest layer in the lamination, and the multilayer scrap is separated into at least two scrap layers. Yamada utilizes heating rolls, a pair of separation rolls downstream from the heating rolls, and rollers which are used to take-up the outer layers of the heated and separated laminate. Yamada also teaches that heating can be performed by hot air or infrared rays. See column 4, lines 61–63. However, this method also suffers from the high energy requirements of heating the laminate trim.

Thus there remains a need for a method and apparatus for separating sheet metal-thermoplastic resin laminate trim composites into their component metal sheets and thermoplastic resin sheets.

SUMMARY OF THE INVENTION

It is an object of the present invention to provide an apparatus and method for simplifying the separation of layers of a laminate.

It is another object of the invention to provide an apparatus and method for separating layers of a laminate without the need for heating the laminate prior to separation.

It is a further object of the invention to provide for the continuous separation of layers of a laminate trim which is generated by a lamination machine.

It is yet another object of the invention to provide an apparatus and method for separating layers of a laminate trim, and which automatically takes up the slack in the laminate trim.

The above and other objects and advantages are achieved in accordance with the present invention by providing a pair of nip rollers arranged to define a path for receiving a laminate trim between the nip rollers and a pair of winders arranged to roll layers of the laminate trim that leave the nip rollers. The winders are provided on an upstream side of the nip rollers so that the layers of the laminate trim are curled at least 90° from the feeding path of the laminate trim into the nip rollers, and a drive system rotates the pair of winders.

In a presently preferred form of the invention, drive motors transmit a predetermined torque to the winders to ensure stability in the delaminating procedure such that the likelihood of the layers of the laminate trim breaking during the separating process is minimized. The predetermined torque is chosen based on the width of the laminate trim. Preferably, the predetermined torque is chosen so that the trim is separated at a maximum rate, yet not so high as to rupture the laminate trim entering the nip rollers. Furthermore, by providing the winders with a predetermined torque, the speed of the winders changes according to the applied load. Therefore, when there is slack in the trim entering the nip rollers, the speed of the winders increases due to the reduced tension in the laminate trim, which thereby causes the winders to pull the laminate trim at a higher speed and eliminate slack.

Preferably, the separating assembly is provided at the output of a lamination machine so that the trim produced by the laminating machine is continuously fed to the separating assembly. Arranged as such, the present invention provides continuous delamination of the trim as it leaves the laminating machine. This arrangement can be advantageous in efficient handling of the trim and, in at least some circumstances, it can be easier to separate the layers when the adhesive used to bond the layers of the laminate trim has not been allowed to cure.

Preferably, the winders are provided with quick release end covers which allow the winder to be partially disassembled so that the trim components wound upon the winder can be removed without removing the winder from its shaft. This allows the process of delamination to be performed nearly continuously with a minimal time delay for emptying the winders.

BRIEF DESCRIPTION OF THE DRAWINGS

Other objects and advantages of the present invention will become readily apparent as the same becomes better understood with reference to the following detailed description, particularly when considered in conjunction with the drawings in which:

FIG. 1 schematically represents a trim separator for separating layers of a laminate trim according to the present invention.

FIG. 2 schematically represents the preferred arrangement of two trim separators used on either side of a lamination machine.

FIG. 5 depicts a laminate trim moving through nip rollers according to the present invention.

FIG. 6 is a view, in the laminate feed direction, of a pair of nip rollers according to the present invention.

DETAILED DESCRIPTION OF THE PREFERRED EMBODIMENTS

Figure 4:
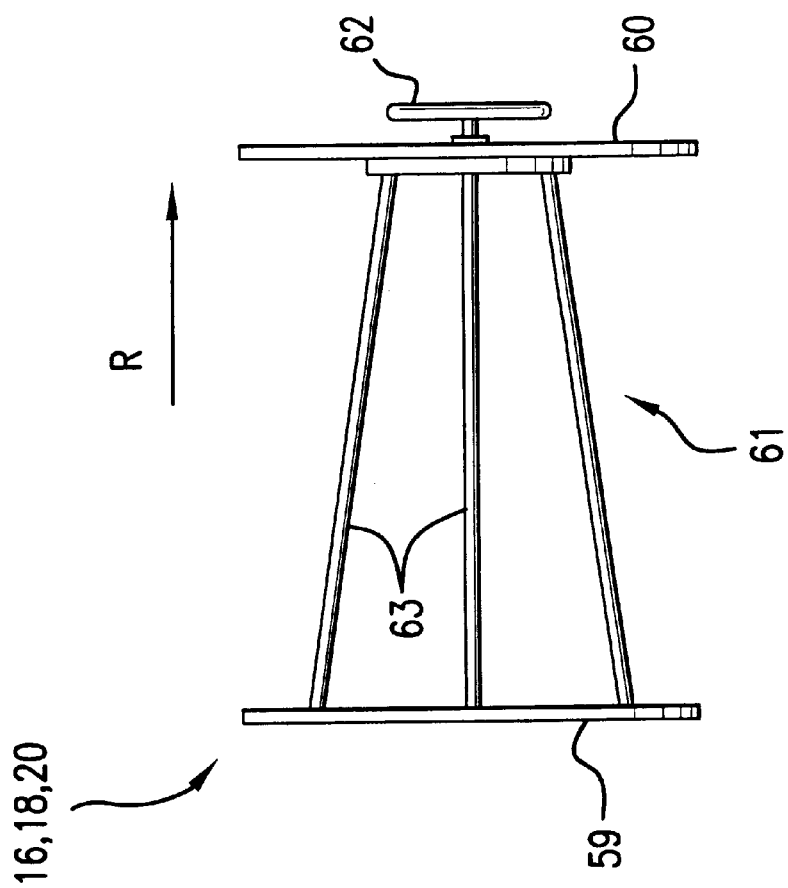
FIG. 4 is a side view of a winder according to the present invention.

A trim separator 10 for separating the layers of a laminate trim according to the invention is illustrated in FIG. 1. It includes a frame 12 with uprights 14 which are configured to mount the winders 16, 18 and 20, and nip rollers 22 with known structures such as shafts and bearings (not shown). As seen in FIG. 6, nip rollers 22 are preferably tapered so as to ensure that laminate trim 34 remains between rollers 22. This embodiment is designed to separate the layers of a three layer laminate, for example, a laminate having an upper layer 24 and a lower layer 26 made of aluminum, with an inner layer 28 made of polyethylene. In this example, the inner layer 28 is bonded to the outer layers 24 and 26 with an adhesive 30 (FIG. 5).

In order to collect the separated layers of such a three layer laminate trim, the present embodiment is provided with three winders. However, it is also possible to utilize only two winders 16 and 18 to separate the layers of a two layer laminate trim, or additional winders for separating multiple layers of a laminate trim. In the FIG. 1 embodiment, winders 16 and 18 are provided on an upstream side of a plane P which is tangential with a leading edge of nip roller 22 and substantially perpendicular to a path 32 defined by nip rollers 22 for receiving laminate trim 34. Winders 16 and 18 are configured to be fed with the outer layers 24 and 26 of laminate trim 34. Such an arrangement of winders 16 and 18 ensures that the layers 24 and 26 can be peeled away from layer 28 such that a peel-away angle B can approach 90° (FIG. 5)

By inducing a severe peel-away angle B, the present invention benefits from the natural tendency of material under bending to undergo tensile strain at its outer surface (i.e., the outer side with respect to the bending direction or, in other words, the side facing away from the roller around which the layer is bent), thereby inducing a shear stress in the adhesive layer 30. More particularly, when a member is subjected to bending, the outer surface of the member is subject to a maximum tensile stress while the inner surface is subjected to a maximum compressive stress. As shown in FIG. 5, layer 24 is subjected to a maximum tensile stress on surface 40 at approximately the cleavage point 42 (where adhesive 30 ruptures upon delamination). The tensile stresses are indicated by arrow T while the compressive forces are labeled as arrows C. The effect of the tensile stress of surface 40 on adhesive 30 at the cleavage point 42 results in a strain or elongation of surface 40 relative to the inner layer 28 at cleavage point 42 causing a shearing stress in the area surrounding 42 in the adhesive. This shearing stress is combined with the tensile stress caused by the winders 16 and 18 pulling layers 24 and 26 away from layer 28. The combination of this shearing stress and the tensile stress cooperate to rupture adhesive 30. Thus, in accordance with one aspect of the invention, by arranging winders 16 and 18 such that the peel-away angle B is approximately 90° (or greater) when cleavage point 42 is approximately between nip rollers 22, the tensile forces along surface 40 are sufficient such that it is not necessary to heat the laminate trim to separate the layers of the laminate trim.

Figure 7:
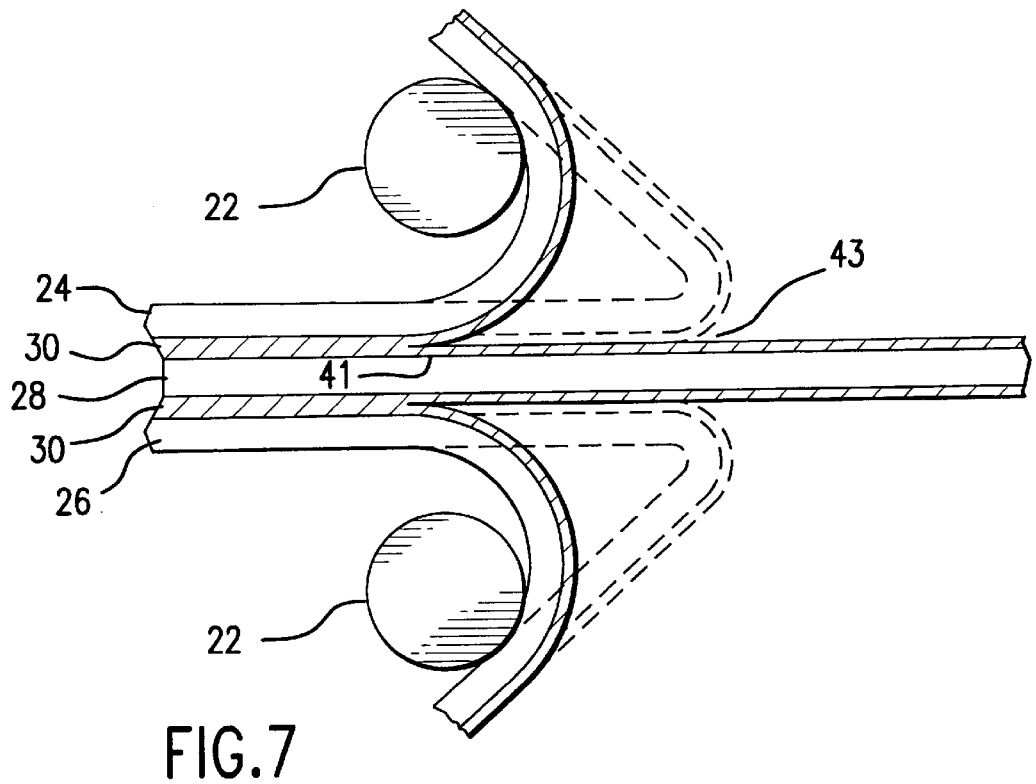
FIGS. 7 and 8 are side views of a pair of nip rollers according to the present invention, illustrating variations in the trim movement during a separating operation.
Figure 8:
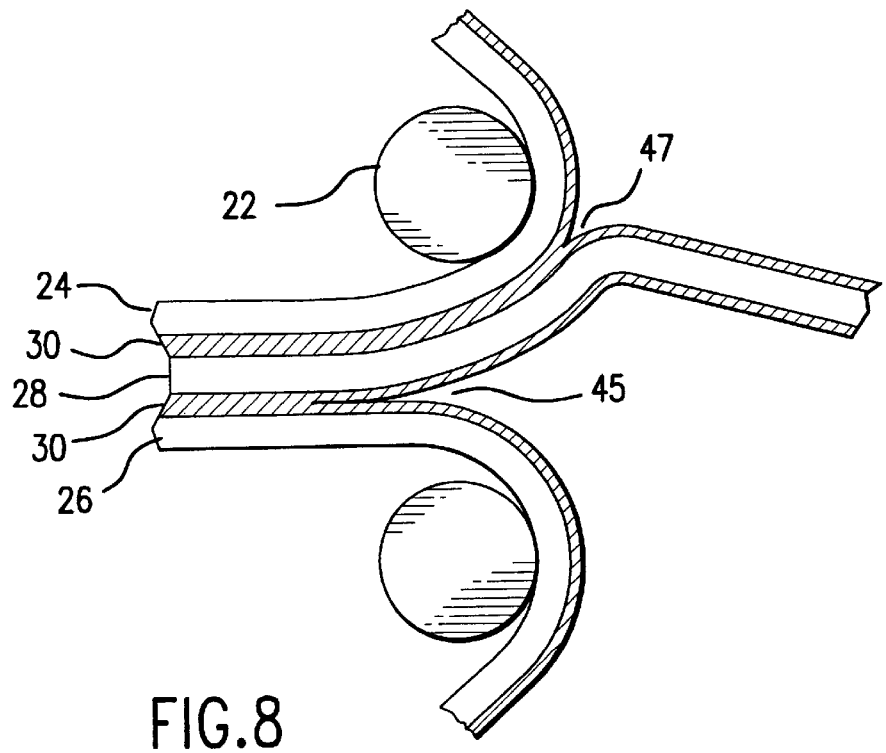
Figure 10:
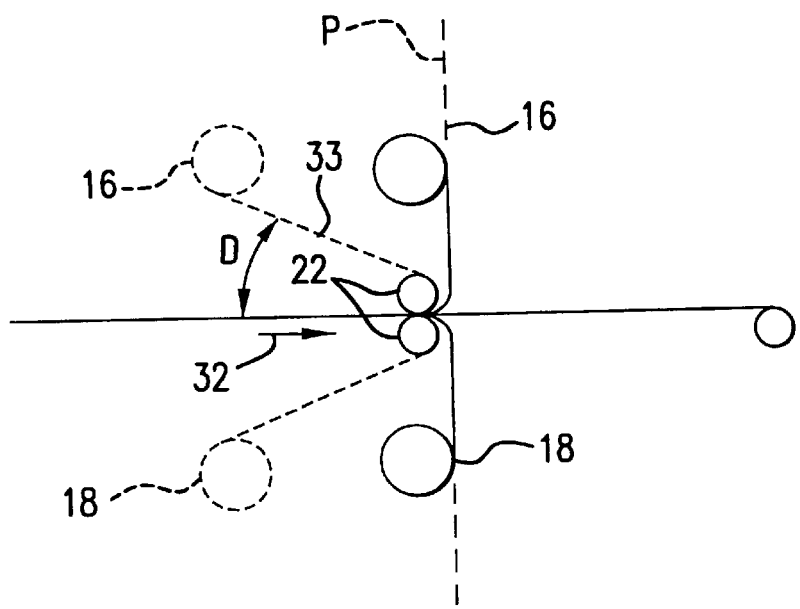
FIG. 10 schematically represents a side view of a pair of nip rollers according to the present invention which illustrates preferred positioning of the winders.
Figure 11:
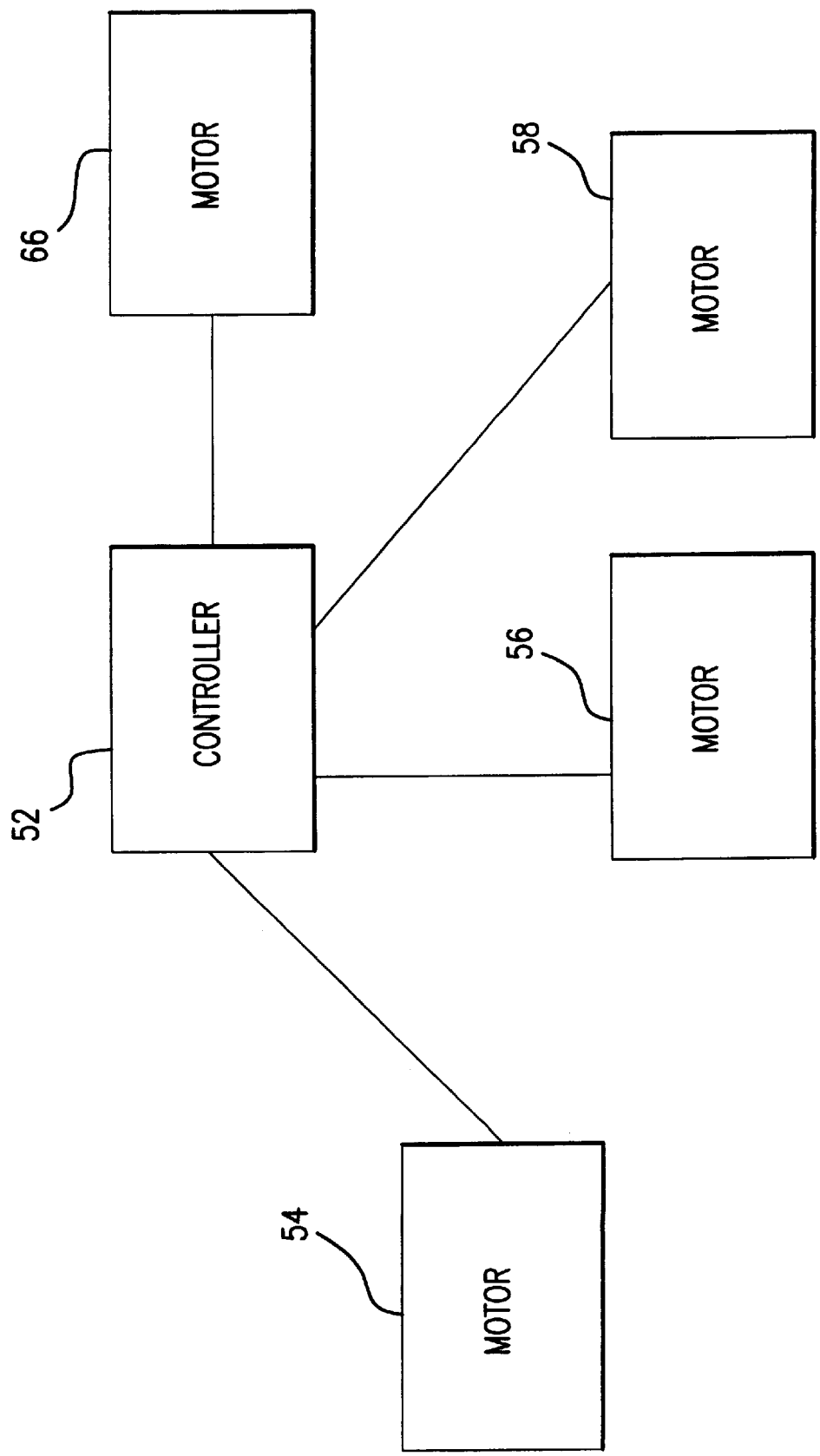
FIG. 11 is a schematic representation of the controller according to the present invention.

During operation, the cleavage point typically does not remain at a constant position relative to nip rollers 22, and thus the cleavage point does not remain between nip rollers 22 at all times. In fact, the cleavage point 42 may move downstream from nip rollers 22. For example, during operation, delamination may occur over short intermittent lengths, with the cleavage point traveling downstream slightly to the point 43 shown in FIG. 7, and then a separation/delamination can occur and the trim will be separated back to point 41 of FIG. 7. Furthermore, the delamination of the top and bottom layers does not always occur at the same point along the feed path, for example, as shown in FIG. 8 (where delamination occurs at cleavage points 47 and 45). Therefore, it is preferable to arrange the winders 16 and 18 such that the point of delamination is kept in proximity to nip rollers 22, so that delamination remains under control and cleavage points remain predictable. To do this, winders 16 and 18 should be arranged so that layer 24 and 26 leaving nip roller 22, downstream from cleavage point 41, 42, 43, 45, 47 make contact with nip rollers 22 before reaching winders 16 and 18. This can be achieved by arranging winders 16 and 18 such that winding angle D, which is the angle between feeding path 32 and winding path 33 along which layer 24 follows from nip roller 22 to winder 16, is between 10° and 80°, and preferably between 25° and 60°, as shown in FIG. 10.

Figure 9:
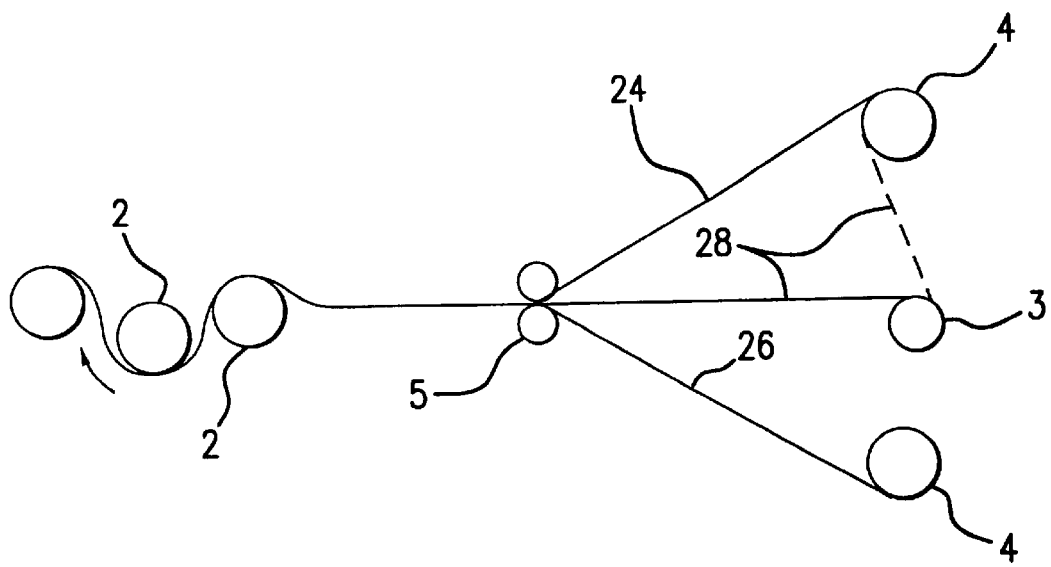
FIG. 9 schematically represents a side view of a separating operation utilizing a pair of nip rollers in a prior art arrangement.

The presently preferred arrangement provides improved results over the prior art. For example, as shown in FIG. 9, if winding rollers 4 are arranged on a downstream side of separation rollers 5, the outer layers of the laminate may not encounter sufficient bending forces, and thus, less than optimal results are achieved. For example, if a particular area in adhesive layer 30 is of a strength such that a peel-away angle B of approximately 90° is needed to create sufficient shear stresses to rupture the adhesive, layer 28 might not separate from layer 24 or the separation could be incomplete, and therefore, layers 24 and 28 may together enter winder 4 and thereby require the apparatus to be stopped and re-threaded. Alternately, heating of the laminate could be required, making the equipment more expensive to manufacture and operate. On the other hand with the presently preferred arrangement, since winders 16 and 18 are arranged on an upstream side of a plane P, layers 24 and 26 can be exposed to a greater peel-away angle so that separation of the laminate layers is improved and more reliable.

If the layers are separated before the adhesive has completely cured, separation of the layers of the laminate trim is substantially easier. Therefore, trim separator 10 is preferably arranged at or near the discharge of trimmer of a laminating machine 46. As shown in FIG. 1, the laminating machine 46 includes a trimmer 48 which is configured to continuously trim the excess material at the edge of a laminate 50 leaving machine 46. Preferably, the laminate trim 34 leaving the trimmer 48, is directly fed to guide 36 adjacent nip rollers 22. The adhesive used for bonding sheet aluminum material with polyethylene, typically requires at least from 15 minutes to one hour to cure. Therefore, by providing the trim separator 10 at the discharge of trimmer 48, the present invention provides a method and apparatus which avoids the need for heating the laminate trim before separation.

Two trimmers 48 are typically used so that both longitudinal edges of a laminate 50 leaving a lamination machine 46 can be trimmed. In that case, two trim separators 10 are used, one separator 10 provided downstream from each trimmer 48, as shown in FIG. 2.

Because it is preferable to provide trim separator 10 at the discharge of trimmer 48, it is most efficient to drive winder 16, 18 and 20 with a varying speed so that any slack in a laminate trim 34 leaving trimmer 48 can be automatically taken up. Therefore, controller 52 is provided to drive DC motors 54, 56 and 58. More particularly, a predetermined amperage is provided to the DC motors, so that each DC motor will transmit a predetermined torque through its output shaft. Alternatively, winders 16,18 and 20 may be driven by a single motor (not shown) coupled to a multiple output transmission (not shown) or a multiple output torque converter (not shown). By controlling the motors 54, 56 and 58 as such, the speeds of the winders 16, 18 and 20 are automatically varied to maintain a predetermined tension in lamination layers 24, 26 and 28 according to the load transmitted to motors 54, 56 and 58 through laminate trim 34. This arrangement is particularly advantageous if the trim separator 10 is shut off while laminating machine 46 is running, since slack then begins to form in laminate trim 34.

If the trim separator 10 is then turned on with the slack remaining in laminate trim 34, there is chance that laminate trim 34 will become tangled. However, with winders 16, 18 and 20 provided with a predetermined torque by motors 54, 56 and 58, the speed of winders 16, 18 and 20 vary according to the tension of laminate trim 34. Preferably, the torque selected is such that the resulting speed of the winders is faster than the output speed of the lamination machine so that slack in laminate trim 34 will be taken up, and a positive tension is thereby maintained in laminate trim 34 leaving the lamination machine 46. However, the maximum possible torque selected and therefore the maximum possible amperage chosen, will be limited by the width of the laminate trim 34 entering the nip rollers 22, i.e., narrow laminate trim will be ruptured if an excessive torque is applied to winders 16, 18 and 20. Once the slack is taken up, the tension in the trim imposes a load upon the winders and thereby slows the winding speed to match the output speed of the lamination machine.

As the winders 16, 18 and 20 are filled with either aluminum or polyethylene layers, the diameter of the spool changes. However, the linear speed of laminate trim 34 leaving lamination machine 46 is typically constant, unless there is slack between machine 34 and nip rollers 22. Therefore, the rotational rate of winders 16, 18 and 20 and therefore motors 54, 56 and 58, will gradually fall as the individual layers of laminate trim 34 gradually accumulate on winders 16, 18 and 20. Accordingly, it is important that drive motors 54, 56 and 58 can be subjected to such speed changes without damage. Therefore, drive motors 54, 56 and 58 are preferably DC motors provided with constant amperage circuits. Such a configuration has a distinct advantage over a AC motor drive in that a DC motor provided with a predetermined amperage and voltage can be significantly loaded and therefore slowed without being damaged, unlike an AC motor.

In a presently preferred form, controller 52 includes a constant amperage circuit. By way of example, a SECO DC DRIVE, model number SE2000, manufactured by WARNER ELECTRIC which can be operated in a torque control mode or a speed control mode. Each drive provided in controller 52, is preferably provided with an amperage meter 51, an amperage adjustment knob 53, and a speed pot knob 55. Amperage adjustment knob 53 allows a user to designate or adjust the amperage output by the drive and therefore the torque produced by the corresponding DC motor. Similarly, speed pot knob 55 allows a user to designate or adjust the maximum voltage output by the circuit and therefore the maximum capable speed of the corresponding DC motor.

In operation, laminate trim 34 leaving lamination machine 46 is initially split into individual layers 24, 16 and 18 by hand, and the layers are threaded through guide 36 and nip rollers 22. Layers 24 and 26 are respectively threaded onto winders 16 and 18 while inner layer 30 is threaded onto winder 20. Alternatively, the laminate trim 34 may be stored on off-line spool 64 and fed to nip roller therefrom.

Once the winders have been threaded with the laminate trim 34, controller 52 is switched on, a predetermined amperage is selected for each winder, and the speed potentiometers (pots) are set to the maximum speed (100%). Setting the speed pots to 100% causes the drives to be saturated so that a maximum voltage is output to the motors 54, 56 and 58 is maintained. Although the speed pots may be set to a percentage lower than the maximum (100%), doing so would limit the maximum speed achieved by the winders and thereby limit the ability of the winders to absorb slack formed in the laminate trim 34 leaving machine 46. Therefore, in the presently preferred embodiment, the speed pots are set to the maximum speed thereby saturating the speed pots so that any slack formed in the laminate trim 34 is absorbed as quickly as possible.

After setting the speed pots, an amperage is selected based on the width of the laminate trim 34 to be separated so that the trim 34 is separated at a maximum speed without being ruptured. Presently, an amperage of 2.0 amps is used to power each of the motors 54, 56 and 58, with the laminate made of aluminum and polyethylene, and with the aluminum layer approximately one-quarter inch wide.

As the winders begin to fill, the diameter of the core of the winders becomes larger due to the accumulation of material. This results in an effective change in the outer diameter of the winder. Because motors 54, 56 and 58 are provided with a predetermined amperage, the rotational rate of motors 54, 56 and 58 will gradually fall as the accumulation of material increases the diameter of winders 16, 18 and 20 without damaging motors 54, 56 and 58. Furthermore, when there is slack in laminate trim 34 entering nip rollers 22, the rotational rate of motors 54, 56 and 58 will approach the maximum possible speed due to the voltage saturation of the drive and the lack of tension in laminate trim 34, thereby removing slack present in laminate trim 34.

Since winders 16, 18 and 20 are provided with a predetermined torque, the tension in trim 34 falls incrementally as the effective diameters of winders 16, 18 and 20 increase. Winders 16, 18 and 20 could be provided with a compensation device for increasing the torque provided to winders 16, 18 and 20 in response to the falling tension. However, the change in tension as the effective diameters of winder 16, 18 and 20 is negligible. Therefore, it is preferable to use a predetermined amperage, and therefore torque, throughout the delamination process yielding a relatively constant tension in trim 34 and layers 24, 26 and 28.

The winders are run until they are filled with a strip of a layer of the laminate trim. At that time, an operator can stop the winders by actuating stop lever 57. The operator then cuts any one of the layers downstream from the nip roller 22, empties the winder, and re-threads the layer onto the empty winder. Thereafter, controller 52 can then be turned back on and the separating process will continue.

Figure 3:
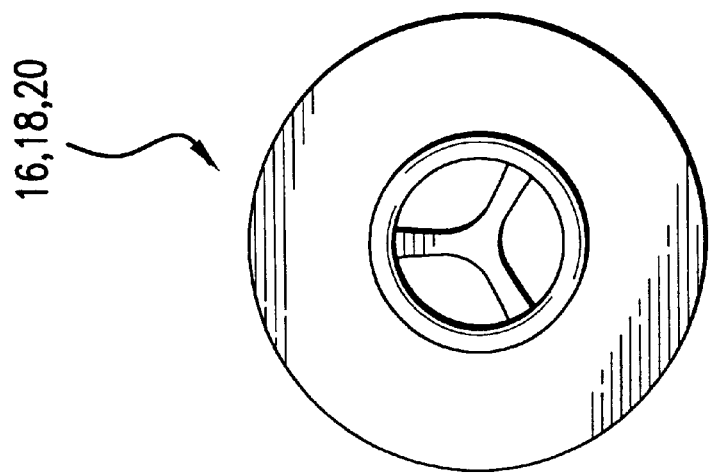
FIG. 3 is an end view of a removable end plate of a winder according to the present invention.

In order to maximize the efficiency and speed of emptying winder 16, 18 and 20, the construction of the winders is made such that the outer cover 60 is releasably mounted on core 61 and held in place by quick release wheel 62. The core of winder 16, 18 and 20 is preferably tapered so that when the cover 60 is removed, the wound material can easily be removed from winder 16, 18 or 20 in the direction of R as shown in FIG. 3. Preferably, core 61 is made from rods 63 arranged in a tapered fashion between back plate 59 and cover 60 such that the core 61 is narrower at cover 60 than at back plate 59. By constructing core 61 from rods, a user can easily insert a hook or a hand into the interior of core 61 and pull the wound material off the core 61 by pulling in the direction of arrow R.

In an alternative embodiment, laminate trim 34 may be separated "off line". In other words, laminate trim 34 may be stored on a spool 64 temporarily, then fed to trim separator 10. Winder 64 is therefore preferably provided with a DC motor 66 and a constant amperage circuit so that spool 64 can be used to accumulate trim and provide a predetermined tension to laminate trim 34 in order to avoid tangling of laminate 34 leaving the lamination machine 46. Used as such, spool 64 can be used to temporarily hold laminate trim 34 if the separator should be down for maintenance or repairs, and the trim accumulated on the spool can then later be run through the separator. In addition, if the separator is to service more than one laminating machine, the separator can continuously receive and separate the trim from one laminating machine, while the trim from another laminating machine is wound upon a spool 64. The trim on spool 64 could then later be run through the separator when the first machine is down. Although the spool 64 can be utilized to store trim which is later delaminated, as discussed earlier, it is presently preferred to delaminate the trim as it is received directly from the laminating machine.

Referring now to FIG. 6, controller 52 is shown connected to motors 54, 56 and 58. Preferably, controller 52 supplies motor 54, 56 and 58 with a predetermined amperage which thereby causes motor 54, 56 and 58 to output a predetermined torque. Controller 52 can also be used to control braking motor 66 so that off-line spool 64 is provided with a predetermined braking torque by using a constant amperage circuit in a similar fashion to those used to control motors 54, 56 and 58.

As should be apparent from the foregoing, the present invention provides an advantageous delaminating arrangement, which is particularly suitable for delaminating a laminate trim received from a lamination machine. The invention is particularly advantageous in that it allows for recycling of trim cuttings which have, in the past, been wasted. The invention is also advantageous in that separation can be accomplished without requiring heat in separating the laminate layers. The invention can be utilized for separating a laminate trim which has been stored upon a spool, however in the preferred arrangement, the trim delaminating arrangement is provided directly downstream from a lamination machine so that the trim is continuously delaminated as it is received from the lamination machine.

Obviously, numerous modifications and variations of the present invention are possible in light of the above teachings. It is therefore to be understood that, within the scope of the appended claims, the invention may be practiced otherwise than as specifically described herein.

What is claimed is:

1. An apparatus for separating layers of a laminate having at least first and second layers, said apparatus comprising:

first and second nip rollers arranged to define a path for receiving the laminate between said nip rollers, wherein said path extends in a first direction through said nip roller;

first and second winders arranged on an upstream side of a plane which passes through said first and second nip rollers and wherein said plane is substantially perpendicular to said first direction, wherein said winders are configured to receive each one of said first and second layers from the laminate leaving said first and second nip rollers;

a drive configured to rotate said first and second winders such that said first and second layers are separated from the laminate leaving said nip rollers and said first and second layers are respectively wound upon said first and second winders; and a lamination machine having means for cutting a longitudinal trim portion from the laminate to form trimmed laminate, wherein said nip rollers receive said longitudinal trim portion and wherein said lamination machine is configured to provide a substantially constant supply of the trimmed laminate to said apparatus for separating layers of the laminate.

2. The apparatus according to claim 1, wherein said drive comprises a first motor configured to drive said first winder and a second motor configured to drive said second winder, said first and second motors including means for providing a predetermined torque to said first and second winders.

3. The apparatus according to claim 2, wherein said means for providing the predetermined torque comprises a drive controller configured to provide a predetermined amperage to said first and second motors, said first and second motors being DC motors.

4. The apparatus according to claim 1, wherein said drive comprises a first DC motor configured to drive said first winder and a second DC motor configured to drive said second winder, said first and second motors being controlled by a drive controller configured to provide a predetermined amperage to said first and second motors, said drive controller being configured to provide a voltage to said first and second DC motors that is sufficient to enable said first and second DC motors to rotate at a maximum capable speed which causes said first and second winders to rotate with a linear speed which is greater than an output speed of the trimmed laminate exiting said lamination machine.

5. An apparatus for separating layers of a laminate having at least first and second layers, said apparatus comprising:
   first and second nip rollers arranged to define a path for receiving the laminate between said nip rollers, wherein said path extends in a first direction through said nip rollers;
   first and second winders arranged on an upstream side of a plane which passes through said first and second nip rollers and wherein said plane is substantially perpendicular to said first direction, wherein said winders are configured to receive each one of said first and second layers from laminate leaving said first and second nip rollers;
   a drive configured to rotate said first and second winders such that said first and second layers are separated from the laminate leaving said nip rollers and said first and second layers are respectively wound upon said first and second; and
   a third winder arranged on a downstream side of said plane, wherein said third winder is configured to receive a third layer of the laminate.

6. The apparatus according to claim 5, wherein said drive comprises a first motor configured to drive said first winder and a second motor configured to drive said second winder, said first and second motors including means for providing a predetermined torque to said first and second winders.

7. The apparatus according to claim 6, further comprising a third motor configured to rotate said third winder, wherein said third motor is configured to transmit a predetermined torque to said third winder.

8. The apparatus according to claim 7, further comprising a drive controller configured to provide a predetermined amperage to said first, second and third motors, wherein said motors are DC motors.

9. An apparatus comprising:
   (a) a lamination machine having:
      (i) means for associating at least first and second layers of material to form a laminate;
      (ii) means for cutting a longitudinal edge of the laminate to form a laminate trim;
   (b) a trim separating assembly comprising:
      (i) first and second nip rollers arranged to define a path for receiving the laminate trim between said nip rollers;
      (ii) first and second winders each configured to receive a respective one of first and second trim layers of the laminate trim leaving said first and second nip rollers; and
      (iii) a drive configured to rotate said first and second winders to separate the laminate trim into said first and second trim layers.

10. The apparatus according to claim 9, wherein said drive comprises a first motor configured to drive said first winder and a second motor configured to drive said second winder, said first and second motors including means for providing a predetermined torque to said first and second winders.

11. The apparatus according to claim 10, wherein said means for providing the predetermined torque comprises a drive controller configured to provide a predetermined amperage to said first and second motors, said first and second motors being DC motors.

12. The apparatus according to claim 10, further comprising a third winder arranged on a downstream side of said nip rollers, wherein said third winder is configured to receive a third layer of the laminate.

13. The apparatus according to claim 12, further comprising a third motor configured to rotate said third winder, wherein said third motor is configured to transmit a predetermined torque to said third winder.

14. The apparatus according to claim 13, further comprising a drive controller configured to provide a predetermined amperage to said first, second and third motors, wherein said first, second, and third motors are all DC motors.

15. The apparatus according to claim 9, wherein said first and second winders are arranged on an upstream side of a plane which passes at least partially through said first and second nip rollers and which is substantially perpendicular to said path.

16. A method of separating layers of a laminate comprising the steps of:
   feeding the laminate to a pair of nip rollers along a feed path;
   feeding a first layer of the laminate leaving said nip rollers to a first winder;
   feeding a second layer of the laminate leaving said nip rollers to a second winder, wherein said first and second winders are at least partially disposed on an upstream side of said nip rollers;
   rotating said first and second winders so as to pull the laminate through said nip rollers and separate the laminate into at least first and second layers; and
   continuously supplying the laminate from a laminating machine to said pair of nip rollers, wherein the laminate forms a longitudinal laminate trim exiting from said laminating machine.

17. The method according to claim 16, wherein said step of rotating comprises transmitting a predetermined torque to said first and second winders.

18. The method according to claim 17, wherein said step of transmitting the predetermined torque comprises the step of providing and maintaining a predetermined amperage to a first DC motor which is configured to rotate said first winder and providing and maintaining a predetermined amperage to a second DC motor which is configured to rotate said second winder.

19. The method according to claim 17, further comprising a step of supplying the laminate from a spool to said pair of nip rollers.

20. The method according to claim 16, wherein said step of transmitting the predetermined torque further comprises the steps of:

providing and maintaining a predetermined amperage to a first DC motor which is configured to rotate said first winder and providing and maintaining a predetermined amperage to a second DC motor which is configured to rotate said second winder; and providing a voltage to said first and second DC motors such that a maximum achievable speed of said first and second DC motors corresponds to a linear speed of said first and second winders, respectively, that is greater than an output speed of the laminate trim exiting from said lamination machine.

21. The method according to claim 16, further comprising the steps of:

stopping said first, second, and third winders;

cutting at least one of the layers of the laminate downstream of said nip rollers;

removing the laminate from around one winder of said first, second, and third winders corresponding to the at least one of the layers of the laminate which has been cut; and threading the at least one of the layers of the laminate which has been cut onto said one winder of said first, second, and third winders corresponding to the at least one of the layers of the laminate which has been cut; and restarting said first, second, and third winders.

22. A method of separating layers of a laminate, said method comprising the steps of:

feeding the laminate to a pair of nip rollers along a feed path;

feeding a first layer of the laminate leaving said nip rollers to a first winder;

feeding a second layer of the laminate leaving said nip rollers to a second winder, wherein said first and second winders are at least partially disposed on an upstream side of said nip rollers;

rotating said first and second winders so as to pull the laminate through said nip rollers and separate the laminate into at least first and second layers, wherein said step of rotating comprises transmitting a predetermined torque to said first and second winders;

feeding a third layer of the laminate leaving said nip rollers to a third winder; and transmitting a predetermined torque to said third winder.

23. The method according to claim 22, wherein said step of rotating said third winder comprises a step of providing and maintaining a predetermined amperage and voltage to a third DC motor which is configured to rotate said third winder.

* * * * *